United States Patent [19]

Baitinger et al.

[11] 3,810,123

[45] May 7, 1974

[54] MONOLITHIC STORAGE MULTI-EMITTER TRANSISTORS WITH DIFFERENT WIDTH BASES

[75] Inventors: Utz G. Baitinger, Stuttgart; Knut K. Najmann, Gartringen, both of Germany

[73] Assignee: International Business Machines Corporation, Armonk, N.Y.

[22] Filed: June 29, 1972

[21] Appl. No.: 267,324

[30] Foreign Application Priority Data

July 29, 1971 Germany.......................... 2137976

[52] U.S. Cl............ 340/173 FF, 307/238, 307/291, 317/235 Z

[51] Int. Cl........................................... G11c 11/40

[58] Field of Search....... 340/173 FF; 307/238, 291; 317/235 Z

[56] References Cited

UNITED STATES PATENTS 3,662,351 5/1972 Ho................................ 340/173 FF

*Primary Examiner*—Vincent P. Canney
*Assistant Examiner*—Stuart Hecker
*Attorney, Agent, or Firm*—John F. Osterndorf; Thomas F. Galvin

[57] ABSTRACT

A monolithic storage matrix having cells formed of multi-emitter transistors in which one emitter of each transistor forms part of the storage circuit and the other emitter of each transistor is coupled to the accessing and retrieval circuits. The transistors portions for storage are formed with bases of a given width and the transistors portions coupled to the accessing and retrieving circuits have a lesser width so that short access times are obtained while the stability of the storage circuit is maintained.

4 Claims, 2 Drawing Figures

MONOLITHIC STORAGE MULTI-EMITTER TRANSISTORS WITH DIFFERENT WIDTH BASES

BACKGROUND OF THE INVENTION

1. Field of the Invention

This invention relates to a monolithic information storage system formed of bipolar storage cells which are arranged in matrix form and are integrated, together with peripheral addressing and read-out circuits, on a semiconductor substrate.

2. Description of the Prior Art

Information storage systems for digital computers are the first widely employed field of application for highly integrated monolithic circuits. For systems with extreme operational speed, storage cells and control circuits designed with bipolar transistors are being used. To achieve maximum bit densities, it is necessary that as much information as possible be stored in a minimum space. In order to practically achieve this goal, steps have been taken to keep the space requirements of a single storage cell very low, and to optimize the mutual arrangement of the individual storage cells with respect to each other in the overall storage arrangement.

For the electrical circuit configuration of the individual storage cells, a flip flop arrangement is utilized. For decreasing the space requirments of the individual storage cell and of the overall storage arrangement, and also for simplifying the integrated technology manufacturing process, the storage cells are arranged in a matrix. A factor in favor of a matrical arrangement is that it results in a substantial reduction in the complexity of the system.

Owing to the arrangement of the storage cells in the matrical form, the individual cells have to be arranged in parallel within the lines of the matrix. The result is that, without special measures owing to manufacturing tolerances of the individual components, large differences occur between the feed currents of the cells within one row. These differences in the feed currents obviously lead to stability problems when these storage cells are fed via a common dropping resistor. These stability problems are particularly great when the actual storage matrix, together with the necessary addressing and read-out circuits, are arranged on a common semiconductor substrate in integrated monolithic technology. Conversely, the use of this technology has the advantage that several components can be made in the same manufacturing process on the common substrate and electrically interconnected in a predetermined manner. Utilizing this design of the circuits, the individual components are influenced in the same sense in their electric characteristics by the tolerances of the manufacturing process. However, the unavoidable disadvantage of this technology is that fixed rules have to be observed when determining the current amplification of the transistors.

It is necessary to make use of the fact that high current amplification of the transistors brings about high switching speed. This means that in the interest of low access times transistors are provided in the addressing and read-out circuits which show high current amplification. However, this also means that owing to the manufacturing technology, the transistors of the storage cells contain a correspondingly high current amplification. As the storage cells consist of flip flops where, according to the information stored, one of the two transistors is always conductive and the other nonconductive. the consequence of high current amplification is that the current on the non-conductive side of the bistable storage cell is very low compared with the current on the conductive side. The always existing leakage currents on the nonconductive side of the storage cells endanger the stability and thus the applicability of the arrangement. Furthermore, the tolerances of the base-emitter characteristics of the respective transistors are strongly affected by the tolerances of the feed currents. In particular, the differences of the base-emitter characteristics between conductive transistors of the storage cells within one and the same row have a negative influence on the stability of the storage cells owing to the parallel arrangement of the storage cells in a row of the matrix.

SUMMARY OF THE INVENTION

According to this invention, the stability of the storage cells is increased upon the simultaneous maintenance of the minimum access time, in spite of the monolithic structure of the storage cells and associated addressing and read-out circuits. The problem is solved in that the transistors of the storage cells show a reduced current amplification compared with the other transistors on the same semiconductor body. To accomplish this objective, the transistors of the storage cells are formed with a larger base width.

An embodiment of the invention provides for each of the storage cells to include, as is well known in the art, two multi-emitter transistors switched as a directly coupled flip flop and having the second emitters of each transistor forming the addressing and read-out circuits for that cell. To fabricate such storage cells, the base regions of the storing transistors of the cells are formed in a first diffusion process and the base regions of the addressing and read-out circuits are formed in a second diffusion process. The result of this two step diffusion process is a unit in which the base regions of the storage transistors have an increased base width owing to the additional temperature cycle of the second diffusion process.

In the method for making the multi-emitter transistor embodiment, an epitaxial layer of the second conductivity type is grown on a substrate of the first conductivity type having embedded therein a subcollector of the second conductivity type. This layer forms the common collector zone. A base region of the first conductivity type with graded base width is generated in the layer. In the zone of greater base width, the emitter of the transistor for the storage cell is introduced and in the zone of the lesser base width the emitter of the transistor for the addressing and read-out circuit is introduced.

An advantage of the inventive storage matrix is the greater stability of the storage cells. The leakage currents of the respective non-conductive transistors are low. Accordingly, the circuit arrangement has extremely low tolerances. Additionally, due to the higher base width of the transistors of the storage cells, short circuits, so-called pipes, are avoided.

DESCRIPTION OF THE PREFERRED EMBODIMENT

Figure 1:
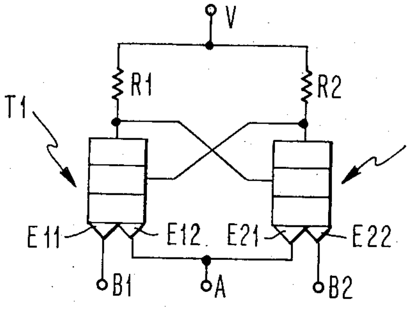
FIG. 1 is a circuit diagram of an embodiment of a storage cell particularly suitable for the inventive storage matrix.

Referring now to the drawing, the embodiment of FIG. 1 serves to explain the inventive concept of providing bipolar storage cells with a particular current amplification and associated control circuit transistors with a different current amplification. In the bipolar storage cell of FIG. 1, a bistable multivibrator is formed consisting of two multi-emitter transistors T1 and T2. The respective collector of each of the transistors is directly coupled to the base of the other transistor. Each collector is connected via a collector resistor R1, R2 to the operating voltage source V. This arrangement can also include additionally a common dropping resistor. Two respective emitters E12 and E21 of the two transistors T1 and T2 are interconnected and coupled to a suitable potential source A. The other two emitters E11 and E22 are connected, through connections B1 and B2, to the read and write lines.

The actual bistable multivibrator forming the storage cell therefore consists of the directly coupled transistors T1 and T2, in connection with their two emitters E12 and E21. The two other transistor systems formed by emitters E11 and E22 of the two transistors T1 and T2 represent, at least partly, the peripheral addressing and read-out circuits for the storage cell. The cells in turn are arranged in a matrix in a manner well known in the art. Each cell would then store one bit of binary information.

The writing or storing of information in the storage cell is performed in the usual manner for a bistable multivibrator. In such a circuit configuration, one of the two branches is always conductive and the other is non-conductive. It is a matter of definition which state is considered to be in the "0" state and which is considered to be in the "1" state. Upon writing one branch is always made non-conductive, so that the other branch is necessarily made conductive, provided the second branch had not been conductive before. Otherwise, it is rendered non-conductive. In the circuit configuration of FIG. 1, a transistor is rendered non-conductive by raising the potential of the two emitters E12 and E21 at connection A, so that the current flow is no longer through these emitters as in the standstill position, but through the write or read line, respectively. When the potential of one of the emitters E11 or E22 is raised, this transistor is rendered non-conductive.

In the reading process, the potential of the two connected emitters E12 and E21 is raised, too. Owing to the two possibilities that a current does, or does not, flow through a read line B1 or B2 the two possible stored states are displayed.

The above-specified problems also exist in this example storage cell if, together with further corresponding cells, it is integrated in monolithic technique on a common semiconductor body and switched in matrix form. In the interest of a low access time to a particular storage circuit, it is necessary that the current amplification of transistors T1 and T2 be kept high. In the conventional technique for the making of a monolithic storage matrix, the transistor systems, characterized by emitters E11 and E22 as well as by emitters E12 and E21 of the two multi-emitter transistors T1 and T2, show a high current amplification. The current through emitter E12 or E21, respectively, of the non-conductive side of the storage cell is low compared with the current on the conductive side. Leakage currents on the non-conductive side thus influence the stability of the storage cell.

The invention now makes use of the fact that for obtaining a short access time only the transistors of the control circuits have to show a high current amplification. The transistors of the actual storage cell can operate with low current amplification. In the present example, this means that in spite of the integrated structure, the transistor systems characterized by emitters E11 and E22 are designed with high current amplification, and those characterized by emitters E12 and E21 are designed with low current amplification and thus also with closer tolerances.

Figure 2:
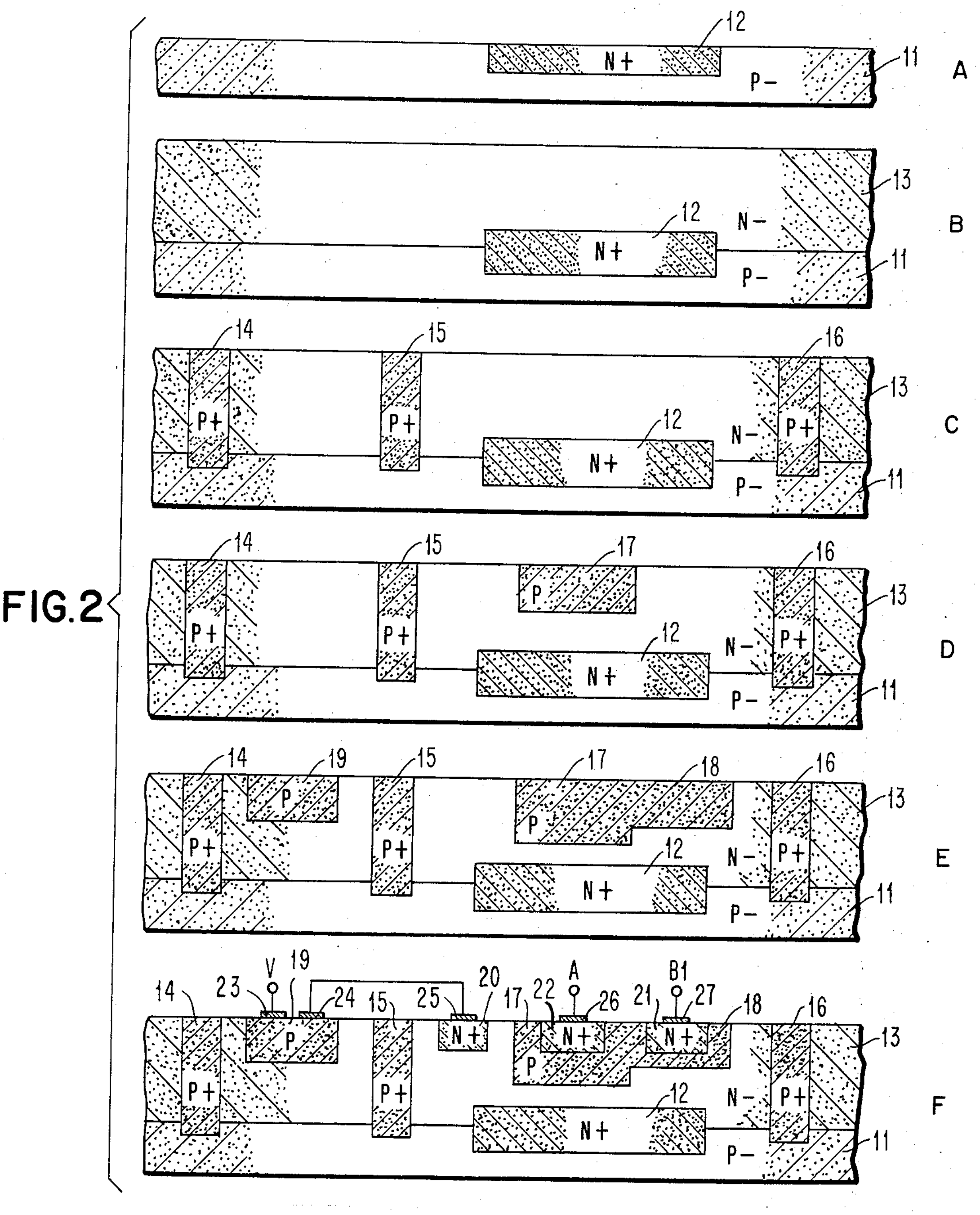
FIGS. 2A-F are schematic views in section of the steps of the method for making this storage cell.

FIG. 2 shows the steps of an advantageous process for making storage cells in accordance with FIG. 1. The manufacturing process is shown only for one half of the storage cell, i.e., transistor T1 and resistor R1. In its main process steps, it equally applies to the other half and for all storage cells to be arranged simultaneously on a common semiconductor wafer. The manufacturing process is based on the silicon planar process for bipolar NPN transistors.

Step A starts from a semiconductor substrate 11 of low $p^-$ doping. By oxidation of the substrate surface, applying, exposing and developing a photoresist, using a suitable mask for the process, and by etching out a diffusion window corresponding to the mask image, and diffusing-in suitable foreign atoms through this window into the substrate, an $n^+$ doped subcollector region 12 is generated. After the removal of the residual photoresist and of the oxide layer, an epitaxial layer 13 of low $n^-$ doping is grown in an epitaxial process (step B). Into this epitaxial layer 13, $p^+$ doped isolation zones 14, 15 and 16 are diffused into substrate 11. This is effected in Step C, again by applying the above-described photographic etching process. Isolation zones 14 and 15 form in the epitaxial layer 13 an isolated region for the resistor R1 to be formed. Isolation zone 16 forms, together with isolation zone 15, an isolated region in the range of subcollector zone 12, the semiconductor zones of multi-emitter transistor T1 being brought into this isolated region.

In the following Step D, by applying the known photographic etching technique and by diffusing suitable impurities in the range of the transistor system to be formed, a p-doped base zone 17 is brought for the actual storage cell into epitaxial layer 13 over subcollector 12. In Step E, a p-doped resistance zone 19 forming resistor R1 is diffused into the isolation region limited by isolation zones 14 and 15, and simultaneously and accordingly, the correspondingly p-doped base zone 18 for the transistor system forming the control circuit is diffused laterally adjacent to base zone 17 and merging into this zone. Upon the subsequent drive-in of base zones 17 and 18, there is an increased base width for base zone 17 compared with base zone 18, as base zone 17 is subject to an additional temperature cycle.

In Step F, again by applying the known photographic etching technique, an $n^+$ doped collector contact zone 20 is formed. In the range of base zone 17 with increased base width, there is provided by diffusion an $n^+$ doped emitter zone 22, and in the range of base zone 18 with low base width there is provided by diffusion an $n^+$ doped emitter zone 21. The diffusions are accomplished simultaneously. For completing the arrangement, the metal contacts 23 and 24 are provided for contacting resistance zone 19, metal contact 25 for contacting the collector zone via collector contact zone 20, and metal contact 26 and 27 for contacting the two emitter zones 22 and 21 are vapor-applied in another procedural step. Through contact 23, resistance zone 19 is connected to operation voltage source V, and through contact 24 it is connected to the collector zone of transistor T1. Emitter zone 22 forming emitter E12 in FIG. 1 is connected to connection A, and emitter zone 21 forming emitter E11 is connected to connection B1.

As shown by the schematic representation, the transistor system forming the control circuit and characterized by emitter E11 now shows the necessary low base width, and the transistor system belonging to the actual storage cell and characterized by emitter E12 shows the increased base width improving the stability of the storage cells.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. An integrated monolithic storage array, comprising:

a plurality of storage cells arranged in matrix form on a semiconductor substrate, each of said cells being formed of a pair of multi-emitter cross-coupled transistors, each said transistor including a storage portion and a control portion;

accessing means connected to the emitters of said control portions for writing into and retrieving information from said cells;

first means within the storage portion of each of said transistors for amplifying current through said storage portions to a first level when said storage portions are operative; and second means within said control portions of said transistors for amplifying current through said control portions to a second level greater than the first level when said control portions are accessed by said accessing means.

2. The array of claim 1, wherein the first means comprises a base region of a first width for said storage portions and the second means comprises a base region of a second width for said control portions, said second width being less than said first width.

3. A storage cell, comprising a pair of multi-emitter cross coupled transistors, each said transistor including a storage portion and a control portion;

accessing means connected to the emitter of said control portions for writing into and retrieving information from said cells;

first means within the storage portions of said transistors for amplifying the current through said storage portions to a first level when operative, and second means within said control portions of said transistors and coupled to said accessing means for amplifying the current through said control portions to a second level greater than the first level when said control portions are accessed by said accessing means.

4. The array of claim 3, wherein the first means comprises a base for region of a first width for said storage portions and the second means comprises a base for region of a second width for said control portions, said second width being less than said first width.

* * * * *